(12) United States Patent
Briggs et al.

(10) Patent No.: US 6,427,624 B1
(45) Date of Patent: Aug. 6, 2002

(54) TEAT CUP LINER FOR MILKING MACHINE

(76) Inventors: Stephen William Briggs, 4 Swallow Drive, Milford-on-Sea, Lymington, Hants, S041 0XD; Jacqueline Anne Carey, 53 Meadowlands, Lymington, Hants, S041 8LB, both of (GB)

( * ) Notice: Subject to any disclaimer, the term of this patent is extended or adjusted under 35 U.S.C. 154(b) by 0 days.

(21) Appl. No.: 09/647,050

(22) PCT Filed: Mar. 23, 1999

(86) PCT No.: PCT/GB99/00751

§ 371 (c)(1),
(2), (4) Date: Oct. 17, 2000

(87) PCT Pub. No.: WO99/48357

PCT Pub. Date: Sep. 30, 1999

(30) Foreign Application Priority Data

Jan. 23, 1999 (GB) .............................................. 9901402
Feb. 17, 1999 (GB) .............................................. 9903482

(51) Int. Cl.$^7$ .............................................. A01K 29/00
(52) U.S. Cl. ............................... 119/14.47; 119/14.01; 119/14.02; 119/14.07; 119/14.08; 119/14.47
(58) Field of Search .......................... 119/14.02, 14.47, 119/14.49, 14.14, 14.1, 14.3, 14.43, 14.45

(56) References Cited

U.S. PATENT DOCUMENTS

| 3,401,672 | A | * | 9/1968 | Berglind | 119/14.49 |
|---|---|---|---|---|---|
| 3,771,494 | A | * | 11/1973 | Mills | 119/14.47 |
| 3,931,795 | A | * | 1/1976 | Duncan | 119/14.38 |
| 3,967,587 | A | * | 7/1976 | Noorlander | 119/14.49 |
| 4,223,635 | A | * | 9/1980 | Akerman | 119/14.02 |
| 4,324,201 | A | | 4/1982 | Larson | 119/14.51 |
| 4,393,811 | A | * | 7/1983 | Bodmin | 119/14.47 |
| 4,441,454 | A | * | 4/1984 | Happel et al. | 119/14.36 |
| 4,483,272 | A | * | 11/1984 | Tonelli | 119/14.32 |
| 4,572,106 | A | * | 2/1986 | Mills | 119/14.47 |
| 4,610,220 | A | * | 9/1986 | Goldberg et al. | 119/14.47 |
| 4,648,350 | A | * | 3/1987 | Noorlander | 119/14.02 |
| 4,651,676 | A | * | 3/1987 | Kupres | 119/14.47 |
| 4,840,141 | A | * | 6/1989 | Marshall | 119/14.47 |
| 4,846,108 | A | * | 7/1989 | Meermoller | 119/14.47 |
| 4,936,254 | A | * | 6/1990 | Marshall | 119/14.47 |
| 5,007,378 | A | * | 4/1991 | Larson | 119/14.47 |
| 5,161,482 | A | * | 11/1992 | Griffin | 119/14.02 |
| 5,215,036 | A | * | 6/1993 | Petterson et al. | 119/14.47 |

(List continued on next page.)

FOREIGN PATENT DOCUMENTS

| EP | 0124118 | 11/1984 |
|---|---|---|
| FR | 2382851 | 10/1978 |
| GB | 2272826 | 6/1994 |
| WO | 9811773 | 3/1998 |

*Primary Examiner*—Charles T. Jordan
*Assistant Examiner*—Stephen Holzen
(74) *Attorney, Agent, or Firm*—Todd N. Hathaway (57) ABSTRACT

The present invention relates to a teat cup liner for milking domestic animals such as cows and goats. The liner includes: an opening into which an animal's teat may be inserted; an outlet for discharging milk from the animal; a teat engaging portion with annular walls; and a collapsible portion having relatively thinner inner walls and seals for a teat cup shell between which lies all of the collapsible portion so a vacuum pressure may be applied to a teat cup assembly to milk the animal. The distance from the opening to a point at which the collapsible portion collapses is sufficient so that the collapsible portion collapses substantially away from the animal's teat. The collapsible portion has an elongate cross section, there being a tapering section between the teat engaging portion and the collapsible portion. The tapering portion has outer and inner walls, the thickness of which tapers more gradually along a minor cross-sectional axis than along a major cross-sectional axis, so that the tapering section may collapse gently on the teat as the collapsible portion collapses.

13 Claims, 3 Drawing Sheets

U.S. PATENT DOCUMENTS

| | | | | |
|---|---|---|---|---|
| 5,317,988 A | * | 6/1994 | Hoefelmayr et al. | 119/14.47 |
| 5,482,004 A | | 1/1996 | Chowdhury | 119/14.52 |
| 5,493,995 A | * | 2/1996 | Chowdhury | 119/14.52 |
| 5,752,462 A | * | 5/1998 | Petersson | 119/14.47 |
| 6,039,001 A | * | 3/2000 | Sanford | 119/14.47 |
| 6,058,879 A | * | 5/2000 | Miefalk | 119/14.47 |
| 6,145,471 A | * | 11/2000 | Laub-Maier | 119/14.02 |
| 6,176,200 B1 | * | 1/2001 | Petterson | 119/14.47 |
| 6,202,593 B1 | * | 3/2001 | Maier et al. | 119/14.47 |

* cited by examiner

TEAT CUP LINER FOR MILKING MACHINE

The present invention relates to a method and an apparatus comprising a teat cup liner and assembly for milking domestic animals.

Milking machines for domestic animals, such as cows (or goats), generally comprise a teat cup cluster with four (or two) teat cup assemblies connected to a manifold, itself connected to a vacuum source to apply a suction on the animal's teats. Milk is thereby drawn from the teat, through the manifold into a milk container. Each teat cup assembly has a teat cup shell and inside this an elongate tubular teat cup liner (called an "inflation" in the USA) of elastomeric material. The suction from the vacuum source is applied in a pulsating manner to both the inside of the liner, and to a space between the shell and the liner. A differential suction pressure between the inside and outside of the liner within the shell causes this portion of the liner, which is more flexible than adjacent portions, alternately to collapse and open up. When the liner opens up, the teat experiences a greater suction causing milk to flow. When the liner closes, the suction is released, and the liner closes around the end of the teat and presses inwards on the end of the teat. An example of this type of teat cup liner is disclosed in patent document EP 0 124 118.

Certain problems have been noted in use with this type of teat cup liner. Firstly, the liner needs to be heavy enough to stretch the animal's teat to open milk ducts. The stretching of the teat stresses the teat tissue, the milk ducts, and sphincter valve at the end of the teat. It has hitherto been believed that this stretching is a cause of inflammation of the teat secretory tissues at the base of the animal's udder, and ultimately mastitis. It has also been thought that the sudden shut off of suction could cause milk to be sucked back into the teat, thereby causing or promoting mastitis. Apart from causing the animal discomfort and pain, these problems can shorten the animal's effective working life.

One prior art teat cup liner which is concerned with the problem of damage to cows' teats is GB 2,272,826 A. This document proposes leaving a gap between the point at which the liner collapses and the end of the teat, in order to reduce friction between the end of the teat and the liner when the liner collapses.

Prior art teat cup liners sometimes have a flexible tube to the manifold which doubles back on itself to constrict the passage through the tube when the teat cup cluster is hung in an inverted orientation prior to milking. Another problem that has been noted with such prior art teat cup assemblies is that these often do not reliably shut off flow into the manifold once hung in the inverted orientation. Although in principle, the teat cup assembly could be made heavier to increase the constriction, it is not possible to make the assembly significantly heavier without worsening the problem of mastitis. Therefore, it is necessary for an operator to manually pull down on such liners in order to set the constriction in the flexible tube. This is inconvenient, but if not done, it is possible for airborne bacteria and fungi to enter the manifold and get into the milk.

A related problem is that increasing the weight, or manual pulling of the liner, can cause the liner to begin to tear where it joins to the manifold, usually at the junction between the liner inner bore and connection nipple on the manifold.

Although each of these problems appears to be quite distinct, a change in one part of the teat cup liner, assembly, or cluster to address one problem can make other problems worse. It has therefore proved difficult to make an improved teat cup liner, assembly or cluster.

It is an object of the invention to provide a teat cup liner, a teat cup assembly, a teat cup cluster and a method for milking domestic animals that addresses at least some of these problems.

According to the invention, there is provided an elongate tubular teat cup liner for milking a domestic animal, comprising: an inlet end with an opening into which a animal's teat may be inserted; an outlet end for discharging milk from the animal; inside the opening a teat engaging portion with annular walls; a collapsible portion adjacent and downstream from the teat engaging portion, the collapsible portion having inner and outer walls being thinner than the walls of the teat engaging portion; an outlet tube leading from the collapsible portion to the outlet end; and a first sealing means and a second sealing means between which lies all of the collapsible portion, the first sealing means being closer to the inlet end than the second sealing means and said first and second sealing means being adapted for making a seal between the outer surface of the liner and a tubular teat cup shell so that a pulsating differential vacuum pressure may be applied to the inner and outer walls of the collapsible portion to cause the collapsible portion to collapse and open repeatedly and so milk the animal, the distance from the opening to a point at which the collapsible portion collapses being sufficient so that the collapsible portion collapses substantially completely away from the animal's teat, characterised in that the collapsible portion has an elongate cross-section with a minor cross-sectional axis and a major cross-sectional axis, there being a tapering section between the teat engaging portion and the collapsible portion, the tapering portion having outer and inner walls the thickness of which tapers more gradually along a plane encompassing the minor cross-sectional axis than along a plane encompassing the major cross-sectional axis, so that the tapering section may collapse gently on the teat as the collapsible portion collapses.

Surprisingly, it has been found that providing a teat cup liner that does not collapse around the end of the animal's teat when the differential suction pressure causes the liner to collapse, greatly improves the problems of mastitis, even though the weight of the teat cup assembly or cluster and the speed at which the suction is shut off are essentially unchanged. The teat cup liner according to the invention therefore allows a gap between the end of the teat and the point where the collapsible portion closes to release the suction on the teat. It is thought that this is because any milk that has not yet flowed away from the teat at the time the collapsible portion closes can pool in this gap without being forced back onto the teat.

If the teat cup liner is for milking a cow or a goat, the distance from the opening to the point at which the collapsible portion collapses should be at least about 100 mm so that the collapsible portion collapses substantially completely away from the teat of the cow or the goat.

In the case of the variety of cows most commonly used in milking herds in the United Kingdom, it has been found that an increase in length from the inlet end to the point at which the collapsible portion closes, from approximately 90 mm to approximately 100 mm is sufficient to provide this effect. Goats have teats which when milked are about the same length as the teats of a cow. A person skilled in the art of milking domestic animals, such as goats or cows will be aware the that different animals and different breeds of animals have different sized teats, both in terms of diameter and length. The exact length of the teat cup liner from the inlet end to the point at which the collapsible portion closes can therefore be chosen accordingly.

Preferably, the teat engaging portion is relatively inflexible compared with the collapsible portion, so that the teat engaging portion may collapse gently on the teat as the collapsible portion collapses. The grip between the teat cup assembly and the teat may therefore be maintained as the suction is released on the end of the teat. The gentle collapse helps avoid abrasion of the sensitive tissues at the teat, and also applies a gentle massaging action to the teat between the periods when full suction is applied.

In order to facilitate mass production and improve hygiene in use, the teat cup liner may be a unitary moulding, rather than being formed from separate components.

In order to reduce the potential for damage to the animal's teat, it is advantageous if the teat cup liner is moulded in a soft elastomeric material, such as a silicone rubber elastomer.

It is particularly advantageous if the elastomeric material is clear or translucent. This allows an operator to make visual inspection of the quantity or quality of milk flowing from a teat, thereby permitting early identification of potential problems in milking performance, including the presence of blood in the milk.

The teat cup assembly will comprise a shell, that may be made from any suitable material, most preferably a clear tough material is such as a polycarbonate plastic. The shell then is fitted to the liner prior to fitting of the liner to the manifold to make up the teat shell cluster. Usually, a separate hose connects to an orifice in the shell to apply suction to the space between the shell and the liner.

In a preferred embodiment of the invention, the first sealing means is an annular rim stretched over a bulbous rim of the teat cup shell. The rim stretches outwardly from the teat cup liner, thereby increasing a positive engagement between the liner and shell at the inlet end of the assembly. Such a positive bond helps keep the liner on the rim if, for example, the assembly is pulled along the ground after the teat cluster has been disconnected from an animal's udder.

Also in a preferred embodiment of the invention, the second sealing means is a series of at least two spaced annular ribs on the outlet tube, the teat cup shell being seated between an adjacent pair of said ribs. This provides the benefit that the other end of the shell is gripped between the ribs, so preventing movement of the shell at this point either along the length of the liner in either direction.

The outlet tube may have near the outlet end a stiffened support region for connection to a nipple of a manifold inlet of the vacuum source, and adjacent and upstream of the stiffened region a local weakened closure region, so that when the assembly is mounted on the nipple with the support region extending upwardly of the manifold inlet, the weight and length of the assembly being enough to bend the closure region sufficiently to pinch shut closure region. In this respect, the fact that the total length of the assembly may be greater than the length of a prior art assembly, owing to the provision of a gap between the teat and point where the collapsible portion closes, can be used to increase the constriction on the weakened region, due to the increased mechanical advantage from the increased length for a given total weight.

The teat cup assemblies may be connected to a nipple of the manifold inlet. In this case, it is preferred if the nipple is rounded so that the nipple does not cut into the stiffened support region when the closure region is bent to pinch shut the closure region. In particular, this can help to reduce any increased propensity for the nipple to cut into the inner bore of the teat cup liner owing to the increased stresses that could be due to the above-mentioned increase in total length of the liner.

Also according to the invention, there is provided a method of milking a domestic animal using a teat cup assembly as described above, when said teat cup assembly is connected to a vacuum source, in which the method comprises the steps of:

a) inserting a teat of the animal into the inlet end of the teat cup liner;

b) applying a differential vacuum pressure to the inner and outer walls of the collapsible portion to cause the collapsible portion to collapse and open repeatedly and so milk the animal, the collapsible portion being spaced sufficiently from the inlet end so that the collapsible portion collapses substantially completely away from the teat;

characterised in that tapering section has tapering walls that collapse partially to gently compress the end of the animal's teat.

The invention will now be described in further detail, by way of example only, and with reference to the accompanying drawings, in which.

Figure 1:
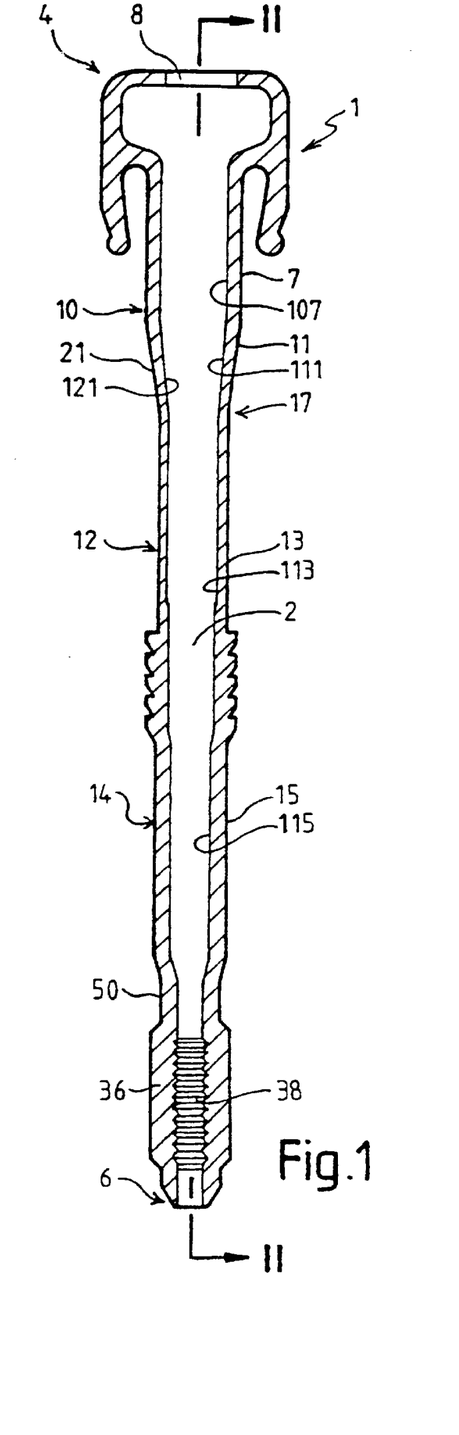
FIG. 1 is a cross-section view through a plane passing through the longitudinal axis of an elongate tubular teat cup liner according to the invention.
Figure 2:
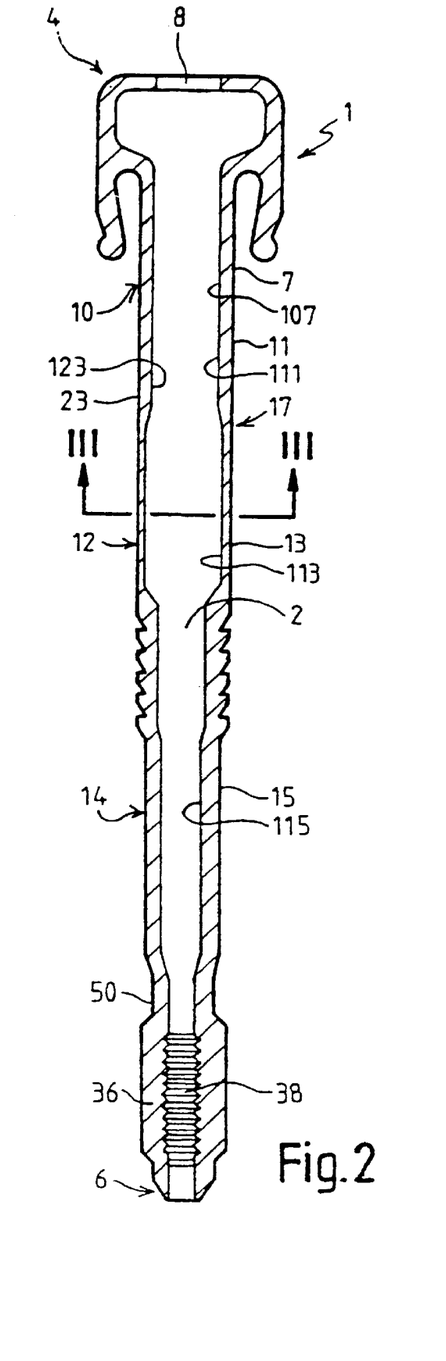
FIG. 2 is a cross-section view similar to that of FIG. 1, but taken in a plane at right angles to that of FIG. 1.

Referring to FIGS. 1 and 2, a teat cup liner 1 for milking a domestic animal is integrally moulded in a soft translucent silicone elastomer with a Shore hardness in the range of 35 to 45, and preferably a range of 40 to 45. The liner is of unitary construction, having an elongate tubular shape. A channel 2 extends the full length of the liner 1, between an inlet end 4 and an outlet end 6 from which milk is discharged. The inlet end 4 has an opening 8 into which a animal's teat (see FIGS. 6 and 7) may be inserted.

The opening 8 leads to a teat engaging portion 10 having outer and inner annular walls 7, 107. Downstream from this is an adjacent collapsible portion 12, that ends in an outlet tube 14 leading to the outlet end 6.

FIGS. 1 and 2, which are to scale, show that the collapsible portion 12 has a inner and outer walls 13, 113 relatively thinner than corresponding nearby walls 11, 111, 15, 115 in the adjacent teat engaging portion 10 and outlet tube 14. Between the teat engaging portion 10 and the collapsible portion 12 is a tapering section 17 with tapering walls 21, 121, 23, 123 where the thickness of the wall tapers between that for the teat engaging portion 10 and that for the collapsible portion 12. Comparison of FIGS. 1 and 2 shows that the wall thickness taper is more gradual in FIG. 1 than FIG. 2.

Figure 3:
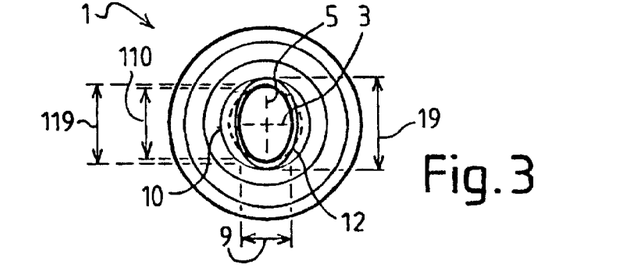
FIG. 3 is cross-sectional view through the collapsible portion of the teat cup liner, taken through lines III—III of FIG. 2.

FIG. 3 shows that cross-section of the collapsible portion 12 is oval, having a minor cross-sectional axis 3 and a major cross-sectional axis 5. A major outer diameter 19 is equal to the diameter of the adjacent teat engaging portion 10. A major inner diameter 119, is however, greater than a corresponding inner diameter 110 of the teat engaging portion 10. A minor inner diameter 9 of the collapsible portion 12 is less than the teat engaging portion inner diameter 110.

The walls 21, 121 in the minor cross-sectional axis 3 of the collapsible portion taper more gradually than the taper of the walls 23, 123 in a major cross-sectional axis 5.

The oval shape causes the collapsible portion 12 to collapse to close the minor diameter. This has a particular effect on the tapering walls 21, 121 in the plane of the minor-cross-sectional axis 3, causing this to collapse partially and gently on an animal's teat as can best be seen in FIG. 7. The tapering walls 23, 123 in the plane of the major cross-sectional axis 5, being of shorter extent, does not significantly collapse. The gentle massaging effect is therefore confined mainly in one direction or plane.

It will be noted from a comparison of FIGS. 1 and 2 that the tapering section 17 in the minor cross-sectional axis 3 is closer the opening 8 than the tapering section 17 in the major cross-sectional axis 5. This helps to concentrate the partial and gentle collapse of the liner in one direction or plane only.

Figure 4:
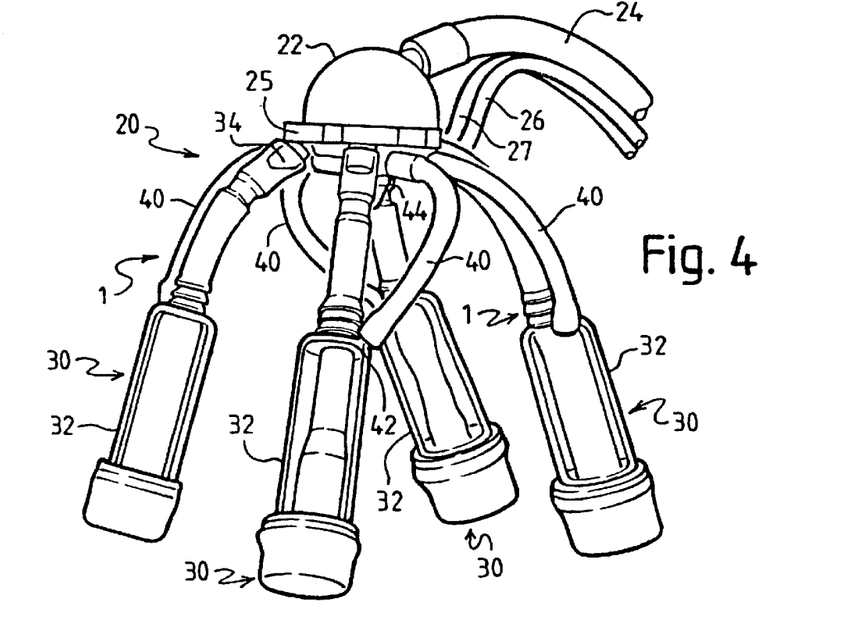
FIG. 4 is a view of a teat cup cluster according to the invention, having a manifold with nipple connections for four teat cup assemblies, each of which has a teat cup shell.

FIG. 4 shows a teat cup cluster 20, having a vacuum manifold 22 connected to a vacuum source via a pair of vacuum lines 26, 27 which are activated alternately so that pairs of teats are milked alternately. Milk is extracted from the manifold via line 24.

Four teat cup assemblies 30, each comprising a teat cup liner 1 and around this a clear polycarbonate shell 32, are connected to the manifold 22 at manifold nipples 34. Each nipple 34 is seated inside a reinforced portion 36 at the outlet end 6 of the liner 1. As can be seen in FIGS. 1 and 2, the channel 2 inside the reinforced or stiffened portion 36 has a series of spaced annular ribs 38. The ribs 38 are very smooth rounded and shallow so that these do not harbour bacteria or fungi when the liner 1 is to be cleaned.

The pulsating vacuum from line 26 or 27 is supplied to the space between the shell 32 and the liner 1 via a flexible hose 40 that runs from the manifold 22 to an orifice 42 in the teat cup shell 32.

When the teat cup cluster 20 is not in use, it may be hung up from a loop 25 provided on a side of the manifold 22 opposite the milk extract line 24 and vacuum lines 26, 27. There is also a loop 44 on a lower surface of the manifold 22 used to support the manifold after milking.

Figure 5:
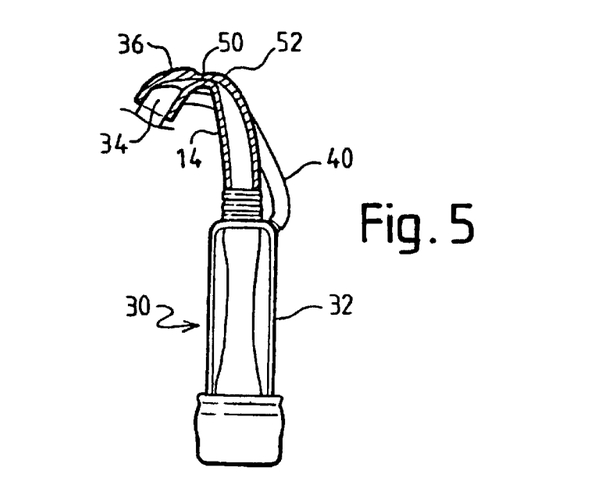
FIG. 5 is a view of a teat cup assembly, hanging downwards from the manifold nipple prior to milking.

When the manifold is inverted, the nipples 34 each extend upwardly by an angle of about 45° as shown in FIG. 5. The weight of the assembly 30 then bears on the junction between the nipple and the teat cup liner, causing the teat cup assembly 30 to sag downwards, so causing the outlet tube 14 to double back on itself. With reference again to FIGS. 1 and 2, the liner 1 has a weakened portion 50 immediately upstream and adjacent the stiffened portion 36. The weight of the assembly is then sufficient, for the angle of about 45°, to pinch closed the channel 2 at a point 52 in the weakened portion 50, without the need for an operator to pull manually down on the inverted assembly 30. If the nipple is set at an angle of less than about 45°, then the required weight of the assembly to pinch shut the weakened portion may become excessive, in terms of stress to an animal's teat.

Figure 6:
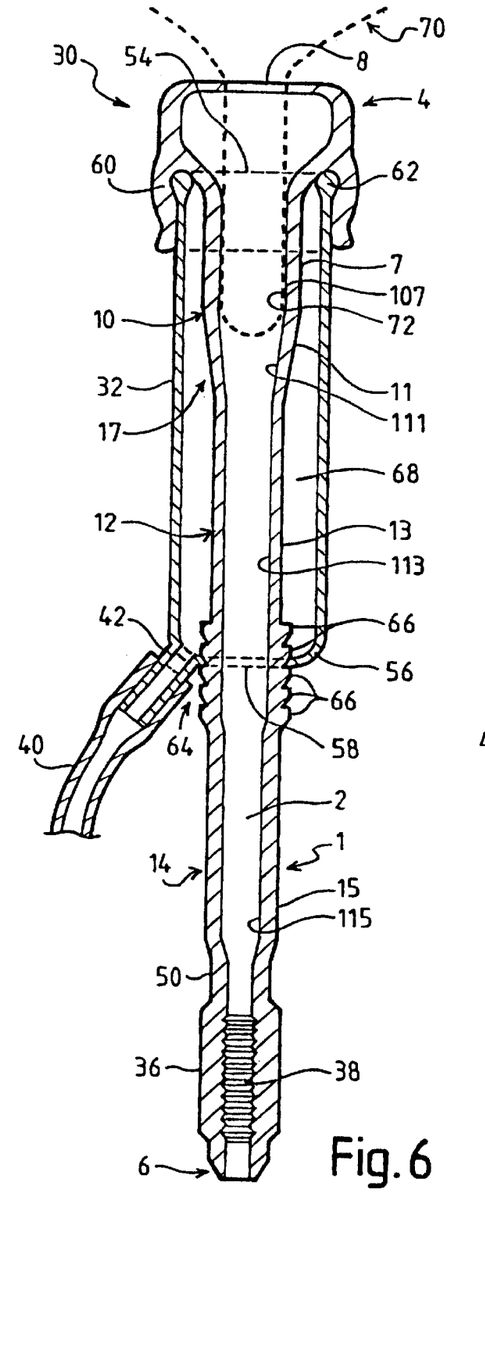
FIG. 6 is a view of the teat cup assembly according to the invention, showing in phantom the location of an animal's udder and teat and the state of the collapsible portion when open to apply suction to the teat.
Figure 7:
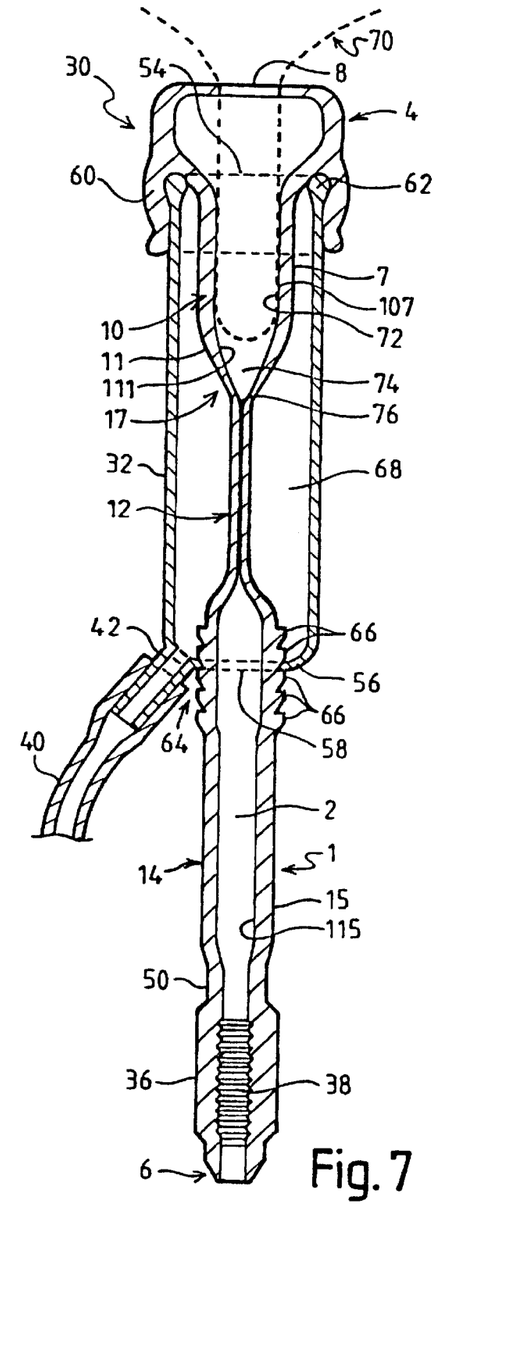
FIG. 7 is a view similar to that of FIG. 6, but with the collapsible portion closed to show the gap between end of the teat and the point at which the collapsible portion closes.

Reference is now made to FIGS. 6 and 7, which show the teat cup assembly in longitudinal cross-section with the liner collapsible portion 12 in, respectively, an open state and a collapsed state.

The teat cup shell 32 has a generally cylindrical form, being fully open at one end 54 nearest the inlet end 4 of the liner 1, and with a neck 56 with a smaller opening at the other end 58. The teat cup shell 32 is concentrically and sealingly engaged with the teat cup liner 1 by means of a first sealing means 60 in the form of a annular rim stretched over a bulbous rim 62 of the teat cup shell 32. The grip between the annular rim 60 and the bulbous rim 62 is sufficient so that if the liner is dragged along a rough floor, the annular rim 60 will not become disengaged from the bulbous rim 62. The liner 1 also has a second sealing means 64 in the form of a series of several spaced annular ribs 66 on the outer surface of the liner, an adjacent pair of which grip opposite walls of the neck 58 of the teat cup shell 32 around the smaller opening.

The first sealing means 60 and second sealing means 64 span all of the collapsible portion 12 and essentially all of the teat engaging portion 10.

The teat shell orifice 42 is provided at the edge of the neck 58. In use, the liner inlet end 4 engages with an animal's udder 70 so that a teat 72 is seated in the channel 2 against the liner teat engaging portion 10. When the suction pressure applied to the space 68 via the tube 40 is greater than the suction pressure applied through the liner channel 2, then the liner collapsible portion stays open as in FIG. 6. When the converse holds, then the liner collapsible portion is closed, as in FIG. 7. As the liner closes, the part of the teat engaging portion 10 closest the collapsing portion gently presses inwards on the animal's teat 72. A gap 74 remains between the end of the animal's teat 72 and the nearest point 76 at which the collapsible portion closes. The gap 74 has sufficient volume to hold any milk that might otherwise be pushed back up against the end of the teat 72.

The teat cup liner and assembly described above may be adapted for use with different types and breeds of domestic milking animals. A goat has teats which are about the same length as cow teats. The distance from the open end 4 of the liner to the end of the teat will be approximately 90 mm for most cows or goats. The distance from the open end 6 to the point 76 should therefore be about at least 100 mm. The total length of such a liner would be about 345 mm.

What is claimed is:

1. An elongate tubular teat cup liner (1) for milking a domestic animal, comprising: an inlet end (4) with an opening (8) into which a animal's teat (70) may be inserted; an outlet end (6) for discharging milk from the animal; inside the opening (8) a teat engaging portion (10) with annular walls (7, 107); a collapsible portion adjacent and downstream from the teat engaging portion (10), the collapsible portion having inner (113) and outer (13) walls being thinner than the walls (7, 107) of the teat engaging portion (10); an outlet tube (14) leading from the collapsible portion (12) to the outlet end (6); and a first sealing means (60) and a second sealing means (66) between which lies all of the collapsible portion (12), the first sealing means (60) being closer to the inlet end (4) than the second sealing means (66) and said first and second sealing means (60, 66) being adapted for making a seal between the outer surface of the liner (1) and a tubular teat cup shell (32) so that a pulsating differential vacuum pressure may be applied to the inner and outer walls (113, 13) of the collapsible portion (12) to cause the collapsible portion (12) to collapse and open repeatedly and so milk the animal, the distance from the opening (8) to a point (76) at which the collapsible portion (12) collapses being sufficient so that the collapsible portion (12) collapses substantially away from the animal's teat (70), characterized in that the collapsible portion (12) has an elongate cross-section with a minor cross-sectional axis (3) and a major cross-sectional axis (5), there being a tapering section (17) between the teat engaging portion (10) and the collapsible portion (12), the tapering portion having outer and inner walls (11, 111) the thickness of which tapers more gradually along a plane encompassing the minor cross-sectional axis (3) than along a plane encompassing the major cross-sectional axis (5), so that the tapering section (17) may collapse gently on the teat (70) as the collapsible portion (12) collapses.

2. A teat cup liner (1) as claimed in claim 1, in which an inner diameter (119) of the collapsible portion (12) along the major cross-sectional axis (5) is greater than an inner diameter (110) of the teat engaging portion (10).

3. A teat cup liner (1) as claimed in claim 1, in which the inner diameter (9) of the collapsible portion (12) along the minor cross-sectional axis (3) is less than an inner diameter (110) of the teat engaging portion (10).

4. A teat cup liner (1) as claimed in claim 1, in which the teat cup liner (1) is a unitary moulding.

5. A teat cup liner (1) as claimed in claim 1, in which the teat cup liner (1) is moulded in a soft elastomeric material.

6. A teat cup liner (1) as claimed in claim 5, in which the elastomeric material is clear or translucent.

7. A teat cup liner (1) as claimed in claim 1, in which the teat cup liner (1) is for milking a cow or a goat, in which the distance from the opening (8) to the point (76) at which the collapsible portion (12) collapses is at least about 100 mm so that the collapsible portion (12) collapses substantially away from the teat (70) of the cow or the goat.

8. A teat cup assembly (30) that may be connected to a vacuum source, the assembly comprising:
    an elongate teat cup liner (1); and
    a tubular teat cup shell (32) around the teat cup liner (1);
    the teat cup liner (1) comprising:
        an inlet (4) with an opening (8) into which an animal's teat (70) may be inserted;
        an outlet end (6) for discharging milk from the animal;
        inside the opening (8) a teat engaging portion (10) with annular walls (7, 107);
        a collapsible portion (12) adjacent and downstream from the teat engaging portion (10), the collapsible portion having inner (113) and outer (13) walls being thinner than the walls (7, 107) of the teat engaging portion (10);
        an outlet tube (14) leading from the collapsible portion (12) to the outlet end (6); and
        a first sealing means (60) and a second sealing means (66) between which lies all of the collapsible portion (12), the first sealing means (60) being closer to the inlet end (4) than the second sealing means (66) and said first and second sealing means (60, 66) being adapted for making a seal between the outer surface of the liner (1) and the tubular teat cup shell (32) so that a pulsating differential vacuum pressure may be applied to the inner and outer walls (113, 13) of the collapsible portion (12) to cause the collapsible portion (12) to collapse and open repeatedly and so mild the animal, the distance from the opening (8) to a point (76) at which the collapsible portion (12) collapses being sufficient so that the collapsible portion (12) collapses substantially away from the animal's teat (70);
    characterized in that the collapsible portion (12) has an elongate cross-section with a minor cross-sectional axis (3) and a major cross-sectional axis (5), there being a tapering section (17) between the teat engaging portion (10) and the collapsible portion (12), the tapering portion having outer and inner walls (11, 111) the thickness of which tapers more gradually along a plane encompassing the minor cross-sectional axis (3) than along a plane encompassing the major cross-sectional axis (5), so that the tapering section (17) may collapse gently on the teat (70) as the collapsible portion (12) collapses.

9. A teat cup assembly (30) as claimed in claim 8, in which the first sealing means is an annular rim (60) stretched over a bulbous rim (62) of the teat cup shell (32).

10. A teat cup assembly (30) as claimed in claim 8, in which the second sealing means is a series of at least two spaced annular ribs (66) on the outlet tube (14), the teat cup shell (1) being seated between an adjacent pair of said ribs (66).

11. A teat cup assembly (30) as claimed in claim 8, in which the outlet tube (14) has near the outlet end (6) a stiffened support region (36) for connection to a nipple (34) of the vacuum source, and adjacent and upstream of the stiffened region a local weakened closure region (50), so that when the assembly (30) is mounted on the nipple (34) with the support region (36) extending upwardly of the nipple (34), the weight and length of the assembly (30) is enough to bend the closure region (50) sufficiently to pinch shut the closure region (50).

12. A teat cup cluster (20), comprising:
    a manifold inlet (22) of a vacuum source; and
    a plurality of teat cup assemblies (30), each teat cup assembly (30) being connected to a nipple (34) of the manifold inlet (22) and comprising:
        an elongate teat cup liner (1); and
        a tubular teat cup shell (32) around the teat cup liner (1);
        the teat cup liner (1) comprising:
            an inlet end (4) with an opening (8) into which an animal's teat (70) may be inserted;
            an outlet end (6) for discharging milk from the animal;
            inside the opening (8) a teat engaging portion (10) with annular walls (7, 107);
            a collapsible portion (12) adjacent and downstream from the teat engaging portion (10), the collapsible portion having inner (113) and outer (13) walls being thinner than the walls (7, 107) of the teat engaging portion (10);
            an outlet tube (14) leading from the collapsible portion (12) to the outlet end (6), the outlet tube (14) having near the outlet end (6) a stiffened support region (36) for connection to a nipple (34) of the vacuum source, and adjacent and upstream of the stiffened region of a local weakened closure region (50), so that when the assembly (30) is mounted on the nipple (34) with the support region (36) extending upwardly of the nipple (34), the weight and length of the assembly (30) being enough to bend the closure region (50) sufficiently to pinch shut the closure region (50), the nipple (34) being rounded so that the nipple (34) does not cut into the stiffened support region (36) when the closure region (50) is bent to pinch shut the closure region (50); and
            a first sealing means (60) and a second sealing means (66) between which lies all of the collapsible portion (12), the first sealing means (60) being closer to the inlet end (4) than the second sealing means (66) and said first and second sealing means (60, 66) being adapted for making a seal between the outer surface of the liner (1) and the tubular teat cup shell (32) so that a pulsating differential vacuum pressure may be applied to the inner and outer walls (113, 13) of the collapsible portion (12) to cause the collapsible portion (12) to collapse and open repeatedly and so milk the animal, the distance from the opening (8) to a point (76) at which the collapsible portion (12) collapses being sufficient so that the collapsible portion (12) collapses substantially away from the animal's teat (70);

characterized in that the collapsible portion (12) has an elongate cross-section with a minor cross-sectional axis (3) and a major cross-sectional axis (5), there being a tapering section (17) between the teat engaging portion (10) and the collapsible portion (12), the tapering portion having outer and inner walls (11, 111) the thickness of which tapers more gradually along a plane encompassing the minor cross-sectional axis (3) than along a plane encompassing the major cross-sectional axis (5), so that the tapering section (17) may collapse gently on the teat (70) as the collapsible portion (12) collapses.

13. A method of milking a domestic animal using a teat cup assembly (30), the method comprising the steps of:

a) connecting a teat cup assembly (30) to a vacuum source, the teat cup assembly comprising:
an elongate teat cup liner (1); and
a tubular teat cup shell (32) around the teat cup liner (1);
the teat cup liner (1) comprising:
an inlet end (4) with an opening (8) into which an animal's teat (70) may be inserted;
an outlet end (6) for discharging milk from the animal;
inside the opening (8) a teat engaging portion (10) with annular walls (7, 107);
a collapsible portion (12) adjacent and downstream from the teat engaging portion (10), the collapsible portion having inner (113) and outer (13) walls being thinner than the walls (7, 107) of the teat engaging portion (10);

an outlet tube (14) leading from the collapsible portion (12) to the outlet end (6); and
a first sealing means (60) and a second sealing means (66) between which lies all of the collapsible portion (12), the first sealing means (60) being closer to the inlet end (4) than the second sealing means (66) and said first and second sealing means (60, 66) being adapted for making a seal between the outer surface of the liner (1) and the tubular teat cup shell (32) so that a pulsating differential vacuum pressure may be applied to the inner and outer walls (113, 13) of the collapsible portion (12) to cause the collapsible portion (12) to collapse and open repeatedly and so milk the animal, the distance from the opening (8) to a point (76) at which the collapsible portion (12) collapses being sufficient so that the collapsible portion (12) collapses substantially away from the animal's teat (70);

characterized in that the collapsible portion (12) has an elongate cross-section with a minor cross-sectional axis (3) and a major cross-sectional axis (5), there being a tapering section (17) between the teat engaging portion (10) and the collapsible portion (12), the tapering portion having outer and inner walls (11, 111) the thickness of which tapers more gradually along a plane encompassing the minor cross-sectional axis (3) than along a plane encompassing the major cross-sectional axis (5), so that the tapering section (17) may collapse gently on the teat (70) as the collapsible portion (12) collapses;

b) inserting a teat (70) of the animal into the inlet end (4) of the teat cup liner (1); and c) applying a differential vacuum pressure to the inner and outer walls (113, 13) of the collapsible portion (12) to cause the collapsible portion (12) to collapse and open repeatedly and so milk the animal, the collapsible portion (12) being spaced sufficiently from the inlet end (4) so that the collapsible portion (12) collapses substantially away from the teat (70).

* * * * *

UNITED STATES PATENT AND TRADEMARK OFFICE
CERTIFICATE OF CORRECTION

PATENT NO.     : 6,427,624 B1
DATED          : August 6, 2002
INVENTOR(S)    : Stephen William Briggs and Jacqueline Anne Carey It is certified that error appears in the above-identified patent and that said Letters Patent is hereby corrected as shown below:

<u>Title page,</u>
Item [30], Foreign Application Priority Data, insert
-- March 23, 1998     (ZA)…………...98/2434 --

Signed and Sealed this

Ninth Day of September, 2003

JAMES E. ROGAN
*Director of the United States Patent and Trademark Office*